United States Patent
Krishnan et al.

(10) Patent No.: US 7,634,120 B2
(45) Date of Patent: Dec. 15, 2009

(54) INCORPORATING SPATIAL KNOWLEDGE FOR CLASSIFICATION

(75) Inventors: Arun Krishnan, Exton, PA (US); Glenn Fung, Bryn Mawr, PA (US); Jonathan Stoeckel, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 681 days.

(21) Appl. No.: 10/915,076

(22) Filed: Aug. 10, 2004

(65) Prior Publication Data

US 2005/0058338 A1 Mar. 17, 2005

Related U.S. Application Data

(60) Provisional application No. 60/494,646, filed on Aug. 13, 2003.

(51) Int. Cl.
    *G06K 9/00* (2006.01)
(52) U.S. Cl. .................. 382/128; 382/173; 382/224
(58) Field of Classification Search ............... 382/224, 382/128
    See application file for complete search history.

(56) References Cited

U.S. PATENT DOCUMENTS

| | | | | | |
|---|---|---|---|---|---|
| 5,273,040 | A | * | 12/1993 | Apicella et al. | 600/410 |
| 5,612,901 | A | * | 3/1997 | Gallegos et al. | 702/3 |
| 5,638,458 | A | * | 6/1997 | Giger et al. | 382/132 |
| 5,757,953 | A | * | 5/1998 | Jang | 382/132 |
| 5,842,194 | A | * | 11/1998 | Arbuckle | 706/52 |
| 5,943,435 | A | * | 8/1999 | Gaborski | 382/132 |
| 6,125,194 | A | * | 9/2000 | Yeh et al. | 382/132 |
| 6,483,934 | B2 | * | 11/2002 | Armato et al. | 382/132 |
| 6,549,646 | B1 | * | 4/2003 | Yeh et al. | 382/132 |
| 6,760,468 | B1 | * | 7/2004 | Yeh et al. | 382/132 |
| 2002/0006216 | A1 | * | 1/2002 | Armato et al. | 382/131 |
| 2002/0141627 | A1 | * | 10/2002 | Romsdahl et al. | 382/131 |
| 2003/0099385 | A1 | * | 5/2003 | Zeng et al. | 382/128 |
| 2003/0099390 | A1 | * | 5/2003 | Zeng et al. | 382/131 |
| 2003/0165216 | A1 | * | 9/2003 | Walker et al. | 378/108 |
| 2005/0016530 | A1 | * | 1/2005 | McCutcheon et al. | 128/200.24 |

(Continued)

FOREIGN PATENT DOCUMENTS

WO    WO 03/070102 A2    8/2003

OTHER PUBLICATIONS

Brown, Matthew S., "Patient-Specific Models for Lung Nodule Detection and Surveillance in CT Images," IEEE Transactions on Medical Imaging 20:Dec. 12, 2000 XP-002201453.*

(Continued)

*Primary Examiner*—Sath V Perungavoor

(57) ABSTRACT

We propose using different classifiers based on the spatial location of the object. The intuitive idea behind this approach is that several classifiers may learn local concepts better than a "universal" classifier that covers the whole feature space. The use of local classifiers ensures that the objects of a particular class have a higher degree of resemblance within that particular class. The use of local classifiers also results in memory, storage and performance improvements, especially when the classifier is kernel-based. As used herein, the term "kernel-based classifier" refers to a classifier where a mapping function (i.e., the kernel) has been used to map the original training data to a higher dimensional space where the classification task may be easier.

18 Claims, 2 Drawing Sheets

U.S. PATENT DOCUMENTS

2005/0033139 A1* 2/2005 Li et al. .................. 600/407

OTHER PUBLICATIONS

Brown M S et al: "Patient-Specific Models for Lung Nodule Detection and Survellance in CT Images" IEEE Transactions on Medical Imaging, IEEE Inc. New York, US, vol. 20, No. 12, Dec. 2001, pp. 1242-1250, XP001101453 ISSN: 0278-0062 p. 1243, col. 2, line 45-49.*

McNitt-Gray, M.F., Huang, H.K., Sayre, J.W., "Feature selection in the pattern classification problem of digitalchest radiograph segmentation", Medical Imaging, IEEE Transactions on, Sep 1995, Vol. 14, Issue: 3, pp. 537-547, ISSN: 0278-0062.*

Brown, Matthew S., "Patient-Specific Models for Lung Nodule Detection and Surveillance in CT Images," *IEEE Transactions on Medical Imaging* 20:Dec. 12, 2000 XP-002201453.

Solka, J.L. et al. "Identification of Man-Made Regions in Unmanned Aerial Vehicle Imagery and Videos," *Transactions on Pattern Analysis and Machine Intelligence*; 20:Aug. 8, 1998.

Kuhnke K. at al., "A System for Machine-Written and Hand-Written Character Distinction;" 0-8186-7218-9/95 IEEE Abstract.

International Search Report.

* cited by examiner

INCORPORATING SPATIAL KNOWLEDGE FOR CLASSIFICATION

CROSS-REFERENCE TO RELATED APPLICATIONS

This application claims priority to U.S. Provisional Application No. 60/494,646, which was filed on Aug. 13, 2003, and which is fully incorporated herein by reference.

BACKGROUND OF THE INVENTION

1. Field of the Invention

The present invention relates to the field of machine classification, and, more particularly, to incorporating spatial knowledge for classification.

2. Description of the Related Art

A classifier is used to classify (i.e., separates) objects into two or more classes. An example of a classifier is as follows. Assume we have a set, A, of objects comprising two groups (i.e., classes) of the objects that we will call A+ and A−. As used herein, the term "object" refers to one or more elements in a population. The classifier, A, is a function, F, that takes every element in A and returns a label "+" or "−", depending on what group the element is. That is, the classifier may be a FUNCTION $F(A) \rightarrow \{-1, 1\}$, where −1 is a numerical value representing A− and +1 is a numerical value representing A+. The classifiers A+ and A− may represent two separate populations. For example, A+ may represent structures in the lung (e.g., vessels, bronchi) and A− may represent nodules. Once the function, F, is trained from training data (i.e., data with known classifications), classifications of new and unseen data can be predicted using the function, F. For example, a classifier can be trained in 10,000 known objects for which we have readings from doctors. This is commonly referred to as a "ground truth."Based on the training from the ground truth, the classifier can be used to automatically diagnose new and unseen cases.

A conventional classifier classifies the objects into classes based on an assumption that objects of the same class have comparable feature values, that is, belong to the same distribution in the feature space. In many applications, however, objects that belong to the same class have different feature values due to, for example, their spatial location. As used herein, the term "feature" refers to one or more attributes that describe an object belonging to a particular class. For example, a nodule can be described by a vector containing a number of attributes, such as size, diameter, sphericity, etc. The vector may contain attribute values, which are termed herein as "feature values."

An existing solution to the above problem is to use a more complex classifier having a higher number of degrees of freedom. One way to create the more complex classifier is by mapping the data into a higher dimensional feature space using kernel mappings. That is, a function K (i.e., the kernel) takes the original data and maps it to a higher dimensional feature space (i.e., a feature space with more features) where the task of finding a classification function is easier to achieve.

For example, suppose the original data is a single case that analyzes a certain number of features. Thus, if the original data has 10 features, a vector for the original data is a 10 dimensional feature space. Suppose also that we have similar data for 1,000 other cases. We can create a similarity function that generates a value indicating how similar the original data is to each of the 1,000 other cases. Thus, a 1,000 dimensional feature space is created, mapped from the 10 dimensional feature space.

As used herein, the term "degrees of freedom" refers to the number of values in the final calculation of a statistic that are free to vary. Another way to produce the more complex classifier is to combine a number of simple classifiers, each trained using different sets of features, in series or in parallel. The results are merged to form an ensemble of classifiers.

These and other comparable approaches have the disadvantage of requiring additional training examples to compensate for the large number of degrees of freedom needed to obtain the same generalization performance. As used herein, the term "generalization performance" refers to the performance of a classifier on new and unseen data. A reduction of generalization performance may occur for many reasons. For example, in the learning (i.e., training) process for classification, similar to the regression case, there is a potential risk of overfitting the training data, resulting in poor predictive performance on new and unseen cases.

SUMMARY OF THE INVENTION

In a first exemplary aspect of the present invention, a method of classifying candidates in an image is provided. The method comprises classifying a first candidate of the image using a first classifier, wherein the first classifier is trained using training data specific to the spatial location of the first candidate; and classifying a second candidate of the image using a second classifier, wherein the second classifier is trained using training data specific to the spatial location of the second candidate; wherein the spatial location of the first candidate is mutually exclusive from the spatial location of the second candidate.

In a second exemplary aspect of the present invention, a method of automatically detecting a nodule on an image is provided. The method comprises obtaining an image; identifying a first spatial location and a second spatial location on the image, wherein the first spatial location is mutually exclusive from the second spatial location; identifying a first candidate in the first spatial location and a second candidate in the second spatial location; classifying whether the first candidate is a nodule using a first classifier, wherein the first classifier is trained using training data specific to the first spatial location; and classifying whether the second candidate is a nodule using a second classifier, wherein the second classifier is trained using training data specific to the second spatial location; wherein the spatial location of the first candidate is mutually exclusive from the spatial location of the second candidate.

In a third exemplary aspect of the present invention, a machine-readable medium having instructions stored thereon for execution by a processor to perform method of classifying candidates in an image is provided. The method comprises classifying a first candidate of the image using a first classifier, wherein the first classifier is trained using training data specific to the spatial location of the first candidate; and classifying a second candidate of the image using a second classifier, wherein the second classifier is trained using training data specific to the spatial location of the second candidate; wherein the spatial location of the first candidate is mutually exclusive from the spatial location of the second candidate.

In a fourth exemplary embodiment of the present invention, a machine-readable medium having instructions stored thereon for execution by a processor to perform method of automatically detecting a nodule on an image is provided.

The method comprises obtaining an image; identifying a first spatial location and a second spatial location on the image, wherein the first spatial location is mutually exclusive from the second spatial location; identifying a first candidate in the first spatial location and a second candidate in the second spatial location; classifying whether the first candidate is a nodule using a first classifier, wherein the first classifier is trained using training data specific to the first spatial location; and classifying whether the second candidate is a nodule using a second classifier, wherein the second classifier is trained using training data specific to the second spatial location; wherein the spatial location of the first candidate is mutually exclusive from the spatial location of the second candidate.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
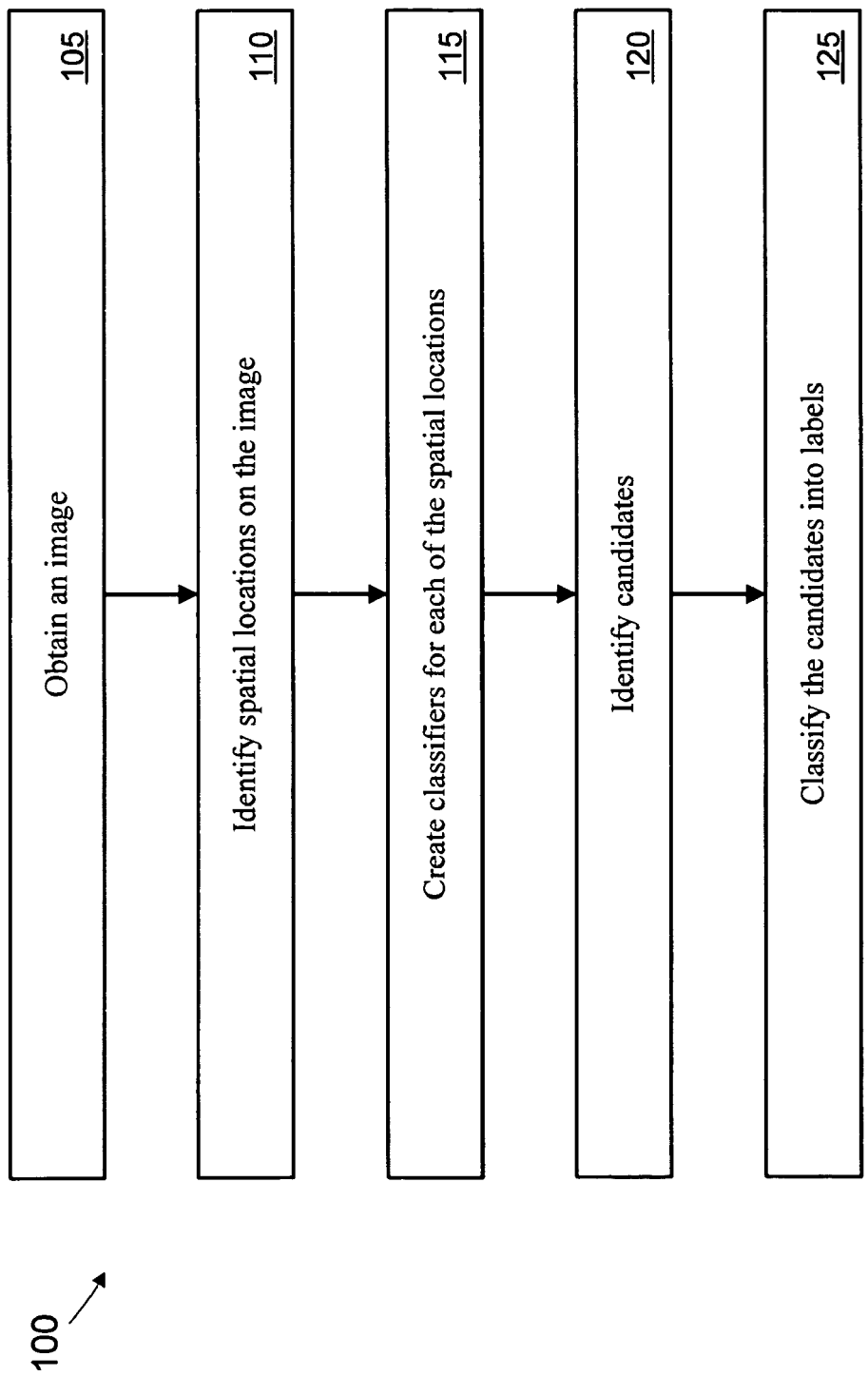
FIG. 1 depicts a method of classifying objects based on the spatial locations of the objects is illustrated, in accordance with one embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Instead of using a single, complex classifier we propose using different classifiers based on the spatial location of the object. The intuitive idea behind this approach is that several classifiers may learn local concepts better than a "universal" classifier that covers the whole feature space. The use of local classifiers ensures that the objects of a particular class have a higher degree of resemblance within that particular class. The use of local classifiers also results in memory, storage and performance improvements, especially when the classifier is kernel-based. As used herein, the term "kernel-based classifier" refers to a classifier where a mapping function (i.e., the kernel) has been used to map the original training data to a higher dimensional space where the classification task may be easier.

Referring now to FIG. 1, a method 100 of classifying objects based on the spatial locations of the objects is illustrated, in accordance with one embodiment of the present invention. The method 100 obtains (at 105) an image. In one embodiment, the image may be obtained from a physical scan of the human body, such as from a computed tomography ("CT"), magnetic resonance imaging ("MRI") or ultrasound device. In another embodiment, the image may be obtained from a satellite imaging system. It should be appreciated that any of a variety of methods and apparatus may be used to obtain the image, as contemplated by those skilled in the art.

The method 100 identifies (at 110) spatial locations for elements on the image. In an image of a lung, for example, potential locations may include a wall-attached location representing elements attached to the lung wall, a bronchi classifier representing elements attached to the bronchi, and an inside-lung classifier representing elements inside the lung. Other images of the human body can be used, such as the heart. For another example, a satellite image may be classified into a type of landmass (e.g., mountain, desert, rainforest). The spatial locations may be identified through, for example, a graphical user-interface. The spatial locations may also be identified automatically using, for example, previous knowledge of various locations on an image. It should be appreciated that various other automated methods (e.g., pattern matching) for identifying spatial locations may be used, as contemplated by those skilled in the art.

Classifiers are created (at 115) for each of the spatial locations. Using the lung scan example above, potential classifiers may include a wall-attached classifier representing elements attached to the lung wall, a bronchi classifier representing elements attached to the bronchi, and an inside-lung classifier representing elements inside the lung. The classifiers may be trained using previously-known data. For example, using the lung scan example above, the classifiers may be trained using training data of elements specified for the particular spatial location. Training data may comprise known and previously-verified data. For example, doctor-verified cases determining whether a nodule exists can be used as training data. The various cases may be separated into spatial locations corresponding to the different classifiers for training purposes. Thus, a wall-attached classifier would be trained using only training data of elements attached to the lung wall. The advantage of such a method is that the classifier takes advantage of any novelties (known and unknown) of elements in a particular location. For example, classifying elements in the bronchi may be different from classifying elements inside the lung.

The method 100 identifies (at 120) candidates. As used herein, the term "candidates" refers to elements (i.e., structures) of interest in the image. Because the classifiers are unique to the spatial locations, the classification of candidates will be more precise than not taking into account the spatial location. Further, using such "local classifiers" also result in memory, storage and performance improvements over complex, universal classifiers. Candidates may be identified manually or automatically using any of a variety of methods and apparatus known to those skilled in the art. For example, computer-aided automatic identification of suspicious regions of interest is well-known in the field of cancer screening.

The method 100 classifies (at 125) the candidates into labels using the appropriate classifier associated with the spatial location where the candidate is located. For example, in the lung scan example above, if a candidate is located inside the lung, then the candidate is classified using the inside-lung classifier. The candidate may be labeled "nodule" representing that a structure (i.e., the element) in the image is a nodule and "no-nodule" representing that the structure is not a nodule. It should be appreciated that any of a variety of labels may be used, as contemplated by those skilled in the art. Further, a candidate may be classified with more than two labels.

It should be appreciated that particular labels can be physically marked on the image for easy identification. For example, in the lung scan example above, a candidate identified as a nodule may be marked so that a human observer (e.g., a doctor) can easily identify the pathology. Different marking types and shapes may be used to differentiate between certain classifiers, as is contemplated by those skilled in the art. An example of a marking may be a square or a circle surrounding each identified nodule.

Figure 2B:
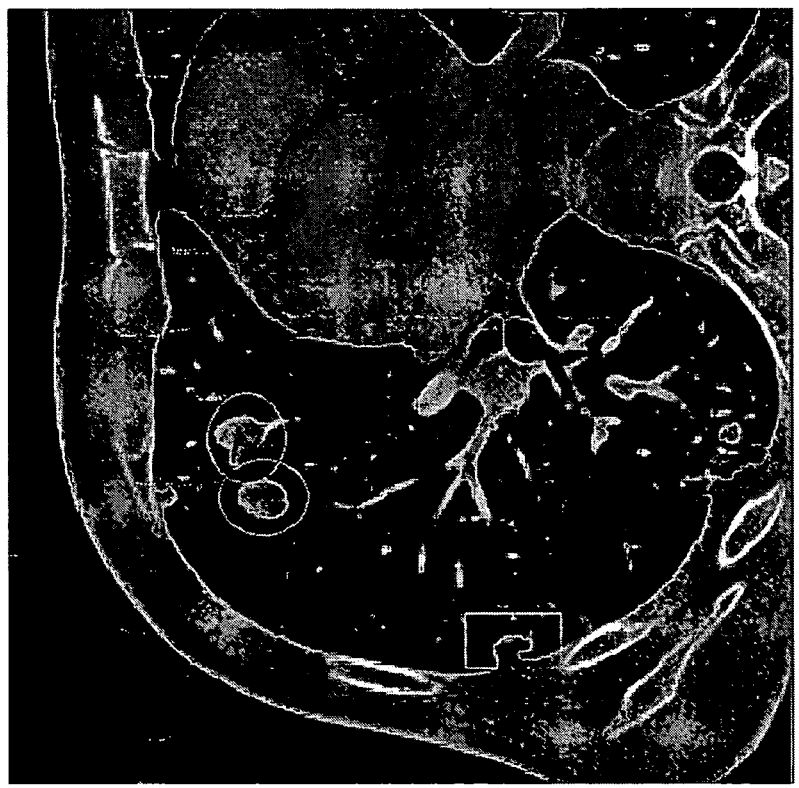
FIGS. 2A and 2B depict exemplary CT lung scans after classification of nodules, in accordance with one embodiment of the present invention.
Figure 2A:
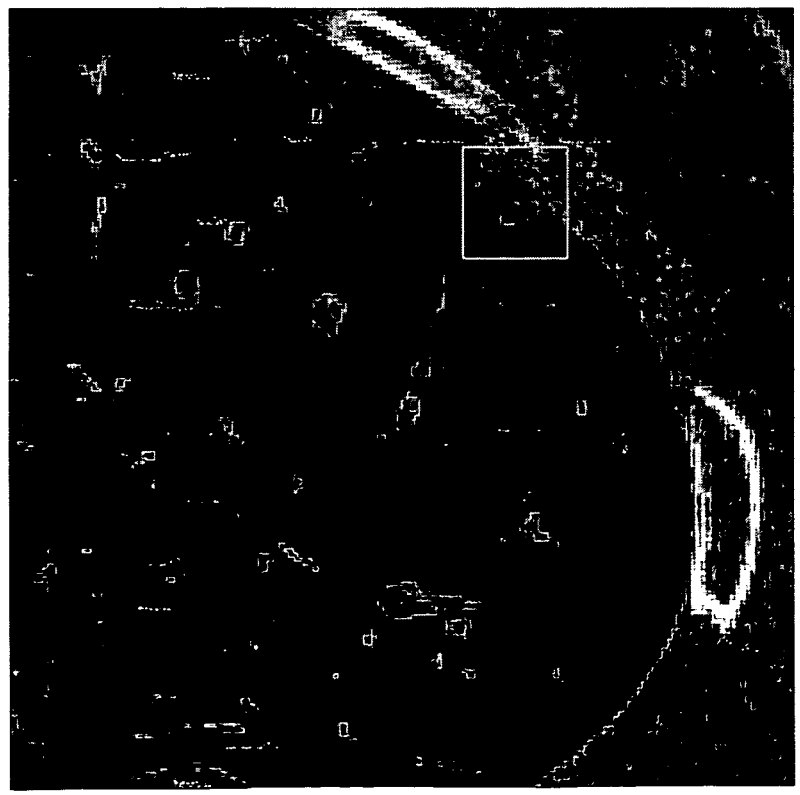

FIGS. 2A and 2B show exemplary CT lung scans that are marked after classification, in accordance with one embodiment of the present invention. The square markings refer to wall-attached nodules, and the circle markings refer to inside-lung nodules.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of classifying candidates in an image in a computer-aided detection (CAD) system, comprising:
   classifying a lung wall-attached candidate of the image located at a lung wall-attached spatial location using a lung wall-attached classifier for identifying a particular class of object in the lung wall-attached spatial location, wherein the lung wall-attached classifier is trained using training data specific to the lung wall-attached spatial location;
   classifying a bronchial candidate of the image located at a bronchial spatial location using a bronchial classifier for identifying the particular class of object in the bronchial spatial location, wherein the bronchial classifier is trained using training data specific to the bronchial spatial location; and
   classifying an inside-lung candidate of the image located at an inside-lung spatial location using an inside-lung classifier for identifying the particular class of object in the inside-lung spatial location, wherein the inside-lung classifier is trained using training data specific to the inside-lung partial location,
   wherein the lung wall-attached spatial location, the bronchial spatial location, and the inside-lung spatial location are mutually exclusive, and wherein the training data specific to the lung wall-attached spatial location, the training data specific to the bronchial partial location, and the training data specific to the inside-lung spatial location include known and previously-verified data from image data of a plurality of prior subjects.

2. The method of claim 1, further comprising obtaining the image.

3. The method of claim 2, wherein obtaining the image comprises obtaining at least one of a CT, MRI or ultrasound image of at least part of a human body.

4. The method of claim 1, further comprising identifying the spatial locations on the image.

5. The method of claim 4, wherein identifying the spatial locations on the image comprises providing a graphical user-interface for manually identifying the spatial locations on the image.

6. The method of claim 4, wherein identifying the spatial locations on the image comprises automatically identifying the spatial locations on the image.

7. The method of claim 6, wherein automatically identifying the spatial locations on the image comprises automatically identifying the spatial locations on the image using known information of the spatial locations.

8. The method of claim 6, wherein automatically identifying the spatial locations on the image comprises automatically identifying the spatial locations on the image using pattern matching.

9. The method of claim 1, further comprising identifying the lung wall-attached candidate, the bronchial candidate and the inside-lung candidate on the image.

10. The method of claim 9, wherein identifying the lung wall-attached candidate, the bronchial candidate and the inside-lung candidate on the image comprises providing a graphical user-interface for manually identifying the lung wall-attached candidate, the bronchial candidate, and the inside-lung candidate on the image.

11. The method of claim 9, wherein identifying the lung wall-attached candidate, the bronchial candidate, and the inside-lung candidate on the image comprises automatically identifying the first candidate and the second candidate on the image.

12. The method of claim 11, wherein automatically identifying the lung wall-attached candidate, the bronchial candidate, and the inside-lung candidate on the image comprises automatically identifying the lung wall-attached candidate the bronchial candidate, and the inside-lung candidate on the image using pattern matching.

13. The method of claim 1, wherein classifying a lung wall-attached candidate comprises automatically classifying whether the lung wall-attached candidate is a nodule, classifying a bronchial candidate comprises automatically classifying whether the bronchial candidate is a nodule and wherein classifying an inside-lung candidate comprises automatically classifying whether an inside-lung candidate is a nodule.

14. The method of claim 1, wherein the training data comprises doctor-verified data.

15. A method of automatically detecting a nodule on an image in a computer-aided detection (CAD) system, comprising:

obtaining an image;

identifying a lung wall-attached spatial location, a bronchial spatial location, and an inside-lung spatial location on the image, wherein the lung wall-attached spatial location, the bronchial spatial location, and the inside-lung spatial location are mutually exclusive;

identifying a lung wall-attached candidate in the lung wall-attached spatial location, a bronchial candidate in the bronchial spatial location, and an inside-lung candidate in the inside-lung spatial location;

classifying whether the lung wall-attached candidate is a nodule using a lung wall-attached classifier, wherein the lung wall-attached classifier is trained using training data specific to the lung wall-attached spatial location;

classifying whether the bronchial candidate is a nodule using a bronchial classifier, wherein the bronchial classifier is trained using training data specific to the bronchial spatial location; and classifying whether the inside-lung candidate is a nodule using an inside-lung classifier, wherein the inside-lung classifier is trained using training data specific to the inside-lung spatial location; wherein the lung wall-attached spatial location, the bronchial spatial location, and the inside-lung spatial location are mutually exclusive and wherein the training data specific to the lung wall-attached spatial location the training data specific to the bronchial spatial location, and the training data specific to the inside-lung spatial location include known and previously-verified data from image data of a plurality of prior subjects.

16. The method of claim 15, further comprising:

marking the lung wall-attached candidate if the lung wall-attached candidate is a nodule;

marking the bronchial candidate if the bronchial candidate is a nodule; and marking the inside-lung candidate if the inside-lung candidate is a nodule.

17. A computer-readable medium having instructions stored thereon for execution by a processor to perform method of classifying candidates in an image, the method comprising:

classifying a lung wall-attached candidate of the image located at a lung wall-attached spatial location using a lung wall-attached classifier for identifying a particular class of object in the lung wall-attached spatial location, wherein the lung wall-attached classifier is trained using training data specific to the lung wall-attached spatial location;

classifying a bronchial candidate of the image located at a bronchial spatial location using a bronchial classifier for identifying a particular class of objects in the bronchial spatial location, wherein the bronchial classifier is trained using training data specific to the spatial location; and classifying an inside-lung candidate of the image located at an inside-lung spatial location using an inside-lung classifier for identifying the particular class of object in the inside-lung spatial location, wherein the inside-lung classifier is trained using training data specific to the inside-lung spatial location; wherein the lung wall-attached spatial location, the bronchial spatial location, and the inside-lung spatial location are mutually exclusive, and wherein the training data specific to the lung wall-attached spatial location, the training data specific to the bronchial spatial location, and the training data specific to the inside-lung spatial location include known and previously-verified data from image data of a plurality of prior subjects.

18. A computer-readable medium having instructions stored thereon for execution by a processor to perform method of automatically detecting a nodule on an image the method comprising:

obtaining an image;

identifying a lung wall-attached spatial location, a bronchial spatial location and an inside-lung spatial location on the image, wherein the lung wall-attached spatial location, the bronchial spatial location and the inside-lung spatial location are mutually exclusive;

identifying a lung wall-attached candidate in the lung wall-attached spatial location, a bronchial candidate in the bronchial spatial location, and an inside-lung candidate in the inside-lung spatial location;

classifying whether the lung wall-attached candidate is a nodule using a lung wall-attached classifier, wherein the lung wall-attached classifier is trained using training data specific to the lung wall-attached spatial location;

classifying whether the bronchial candidate is a nodule using a bronchial classifier, wherein the bronchial classifier is trained using training data specific to the bronchial spatial location; and classifying whether the inside lung-candidate is a nodule using an inside-lung classifier, wherein the inside-lung classifier is trained using training data specific to the inside-lung spatial location;

wherein the spatial location of the lung wall-attached candidate, the spatial location of the bronchial candidate, and the spatial location of the inside-lung candidate are mutually exclusive and wherein the training data specific to the lung wall-attached spatial location the training data specific to the bronchial spatial location, and the training data specific to the inside-lung spatial location include known and previously-verified data from image data of a plurality of prior subjects.

* * * * *